United States Patent
Ahn et al.

(10) Patent No.: US 8,714,791 B2
(45) Date of Patent: May 6, 2014

(54) DETACHABLE LUGGAGE LAMP

(75) Inventors: Byoung Suk Ahn, Suwon-si (KR); Sang Woo Park, Gunpo-si (KR); Choon Woo Park, Seoul (KR)

(73) Assignees: Hyundai Motor Company, Seoul (KR); Il Heung Co., Ltd., Pocheon-Si (KR)

( * ) Notice: Subject to any disclaimer, the term of this patent is extended or adjusted under 35 U.S.C. 154(b) by 86 days.

(21) Appl. No.: 13/491,034

(22) Filed: Jun. 7, 2012

(65) Prior Publication Data

US 2013/0155659 A1 Jun. 20, 2013

(30) Foreign Application Priority Data

Dec. 16, 2011 (KR) .................. 10-2011-0136043

(51) Int. Cl.
*B60Q 3/06* (2006.01)
*B60Q 3/02* (2006.01)
*F21L 4/04* (2006.01)
*F21L 4/08* (2006.01)

(52) U.S. Cl.
CPC .............. *B60Q 3/065* (2013.01); *B60Q 3/0269* (2013.01); *F21L 4/045* (2013.01); *B60Q 3/02* (2013.01); *F21L 4/085* (2013.01)
USPC ............ 362/488; 362/190; 362/191; 362/183

(58) Field of Classification Search
CPC .............. F21L 4/00; F21L 4/04; F21L 4/045; F21L 4/08; F21L 4/085; F21L 15/06; F21V 21/08; F21V 21/088; F21V 19/003; B60Q 3/0266; B60Q 3/06; B60Q 3/065; B60Q 3/0269

USPC ........................................... 362/190, 191, 488
See application file for complete search history.

(56) References Cited

U.S. PATENT DOCUMENTS

| | | | | |
|---|---|---|---|---|
| 5,077,643 A | * | 12/1991 | Leach | 362/183 |
| 6,022,131 A | | 2/2000 | Morimoto et al. | |
| 6,231,219 B1 | * | 5/2001 | Lohss et al. | 362/486 |
| 7,878,668 B2 | * | 2/2011 | Martinez | 362/20 |

FOREIGN PATENT DOCUMENTS

| | | |
|---|---|---|
| JP | H10147150 (A) | 6/1998 |
| JP | H10181445 (A) | 7/1998 |
| KR | 1998-044552 A | 9/1998 |
| KR | 1999-021492 A | 3/1999 |
| KR | 2003-0016948 A | 3/2003 |
| KR | 100773303 (B1) | 11/2007 |
| KR | 1020110110522 (A) | 10/2011 |

* cited by examiner

*Primary Examiner* — Diane Lee
*Assistant Examiner* — Kenny C Sokolowski
(74) *Attorney, Agent, or Firm* — Morgan, Lewis & Bockius LLP

(57) ABSTRACT

A detachable luggage lamp is used as a luggage lamp by fixing a flashlight to a stationary part at ordinary times and used by separating the flashlight from the luggage lamp, if necessary. The flashlight of the luggage lamp may include a lamp housing having an opening surface formed on one side thereof, a lamp disposed in the opening surface, and a battery embedded in the lamp housing and supplying power to the lamp and a stationary part including a stationary housing having an accommodating part having a shape corresponding to the lamp housing and having an inclined reflective surface mounted on a surface thereof corresponding to the opening surface of the lamp housing, wherein the lamp housing and the stationary housing include a fastening member.

4 Claims, 5 Drawing Sheets

DETACHABLE LUGGAGE LAMP

CROSS-REFERENCE TO RELATED APPLICATION

The present application claims priority of Korean Patent Application Number 10-2011-0136043 filed Dec. 16, 2011, the entire contents of which application is incorporated herein for all purposes by this reference.

BACKGROUND OF INVENTION

1. Field of Invention

The present invention relates to a detachable luggage lamp which is used as a luggage lamp by fixing a flashlight to a stationary part at ordinary times and is used by separating the flashlight from the luggage lamp, if necessary.

2. Description of Related Art

Some of the vehicles manufactured from the past have a flashlight embedded therein. As a type of the flashlight, there are a type in which a flashlight is simply embedded in a luggage trim of a vehicle and a type in which a flashlight is used as a luggage lamp in a luggage trim at ordinary times and is then separated therefrom, if necessary, so as to be used as the flashlight.

However, the type in which in which a flashlight is used as a luggage lamp in a luggage trim at ordinary times and is then separated therefrom, if necessary, so as to be used as the flashlight is a type in which a light source for a flashlight and a light source for a luggage lamp are separately provided. The relate art uses two light sources and requires an additional electric circuit therefor.

An exemplar of a known light assembly is US Unexamined Patent Publication No. US2007/0133219A1.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the above-mentioned problems occurring in the prior art while advantages achieved by the prior art are maintained intact.

Various aspects of the present invention provide for a luggage lamp capable of faithfully performing two functions while improving an appearance thereof, by integrating a function of a luggage lamp and a flashlight as a single light source.

In various aspect of the present invention, there is provided a detachable luggage lamp used as a luggage lamp by fixing a flashlight to a stationary part at ordinary times and used by the flashlight from the luggage lamp, if necessary, wherein the flashlight includes a lamp housing having an opening surface formed on one side thereof, an optics mounted on the opening surface, a lamp disposed in the opening surface, and a battery embedded in the lamp housing and supplying power to the lamp, and the stationary part includes a stationary housing having an accommodating part having a shape corresponding to the lamp housing and having an inclined reflective surface mounted on a surface thereof corresponding to the opening surface of the lamp housing, and wherein the lamp housing and the stationary housing include a fastening member.

The fastening member may include a stumbling groove formed on an opposite surface to the opening surface of the lamp housing, a fastening jaw formed on at least one side based on the opening surface and the opposite surface, a stumbling projection formed on an opposite surface of the reflective surface of the stationary housing, and a fastening projection mounted at a position corresponding to a mounting position of the projection jaw on at least one side based on the reflective surface and the opposite surface, and at the time of fixing, the lamp housing may be pushed into the accommodating part of the stationary housing in a state in which the stumbling groove is fitted into the stumbling projection so that the fastening jaw is fitted into the fastening projection and at the time of separating, fingers may put in the space formed by the reflective surface to pull the opening surface of the lamp housing, thereby separating the fastening jaw from the fastening projection and then, separating the stumbling groove from the stumbling projection.

Both sides of the reflective surface may be fitted with a hinge optic formed with a hinge shaft so as to be rotatably coupled with the hinge optic, the hinge optic being elastically supported outwardly by a spring, and an outer surface of the hinge optic may be disposed on the same plane as an outer surface of the stationary housing at ordinary times and then, the hinge optic may rotate to the reflective surface when being downwardly pressed with fingers so as to separate the flashlight from the luggage lamp.

The stationary housing may include connection terminals connected with the power supply for a vehicle, the lamp housing may include connection terminals that are connected with the connection terminals, respectively, the battery may be charged with normal power that is input from the connection terminal, and the connection terminal may be connected with the lamp and the lamp may be turned on/off by the controlled power that is input from the connection terminal.

The battery and the lamp may be electrically connected with each other through the first switch and a second switch and the first switch may be a switch that is mounted in the lamp housing to be opened or closed by the user and the second switch may be opened by being pressed when the lamp housing is accommodated in the fixing housing and may be closed by being pressed off when the lamp housing is separated from the stationary housing.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various embodiments of the present invention relate to a detachable luggage lamp which is used as a luggage lamp by fixing a flashlight 1 to a stationary part 2 at ordinary times and is used by separating the flashlight 1 from the luggage lamp, if necessary.

Figure 1:
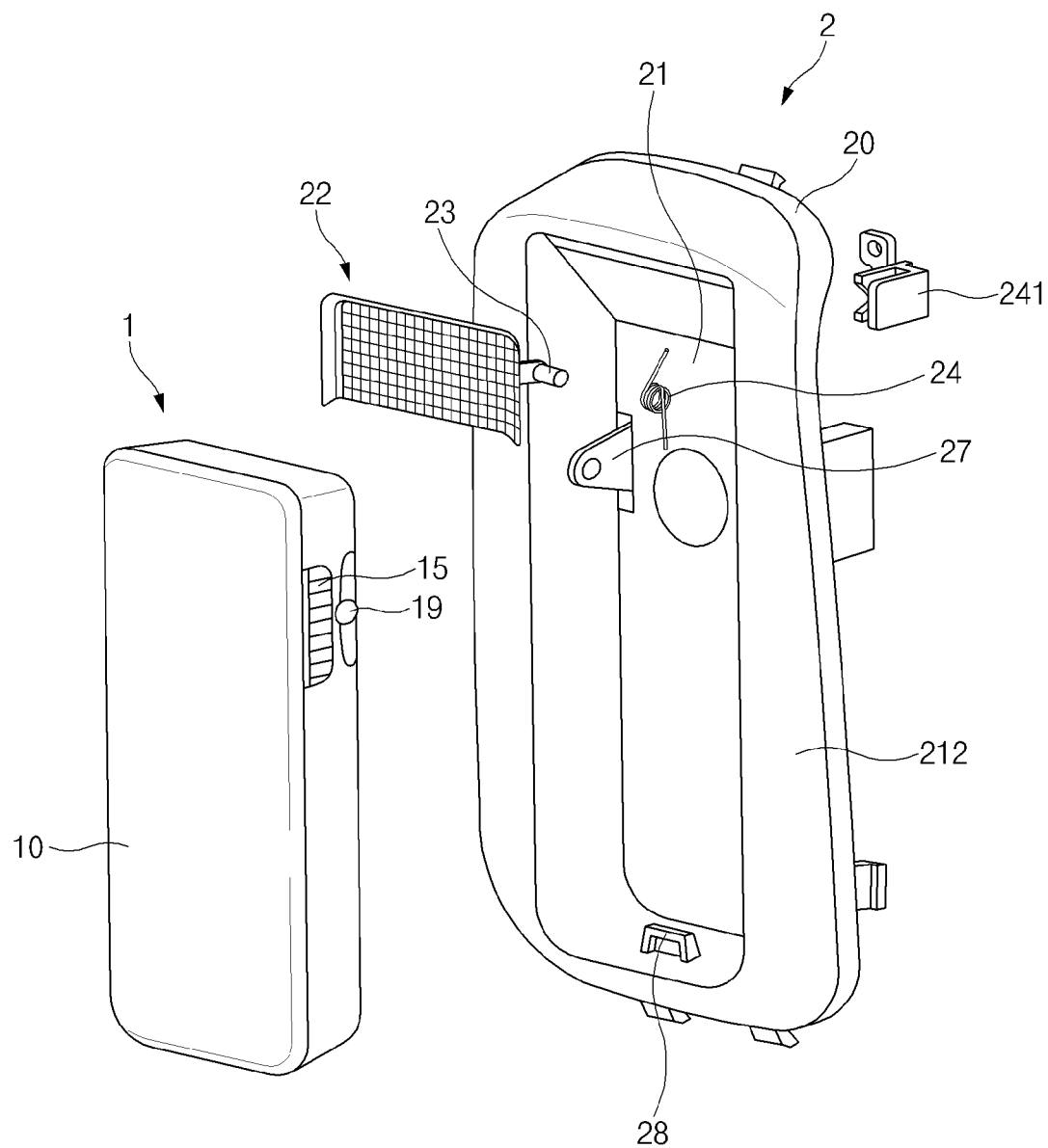
FIG. 1 is an exploded perspective view of an exemplary luggage lamp according to the present invention.
Figure 2:
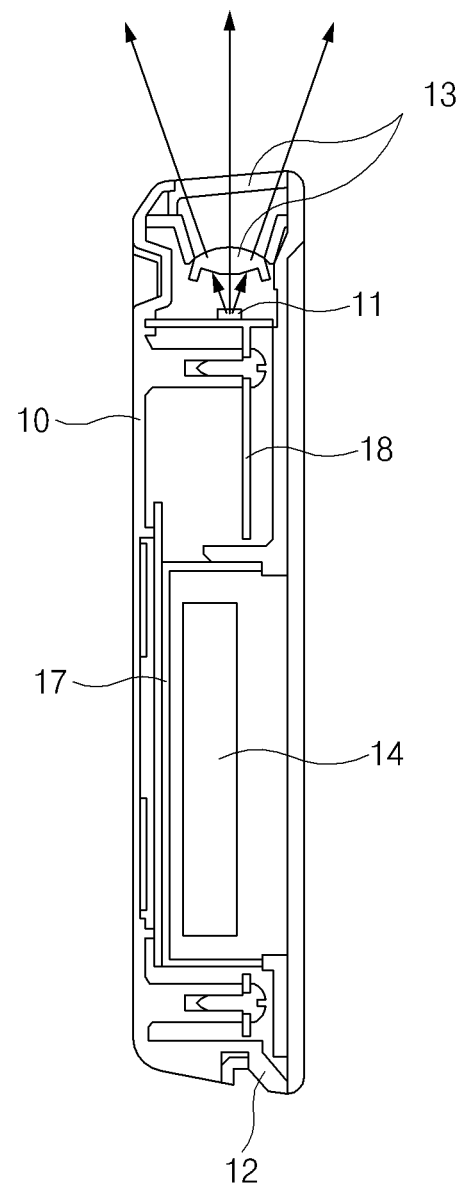
FIG. 2 is a cross-sectional view of an exemplary flashlight according to the present invention.

Referring to FIGS. 1 and 2, the flashlight 1 includes a lamp housing 10 having an opening surface formed on a top surface thereof, an optics 13 disposed on the opening surface, a lamp 11 disposed in the opening surface, and a battery 14 embedded in the lamp housing 10 and supplying power to the lamp 11.

Therefore, when separating the flashlight 1 from the luggage lamp, the lamp 11 is lit by being supplied with power from the battery 14.

Figure 3:
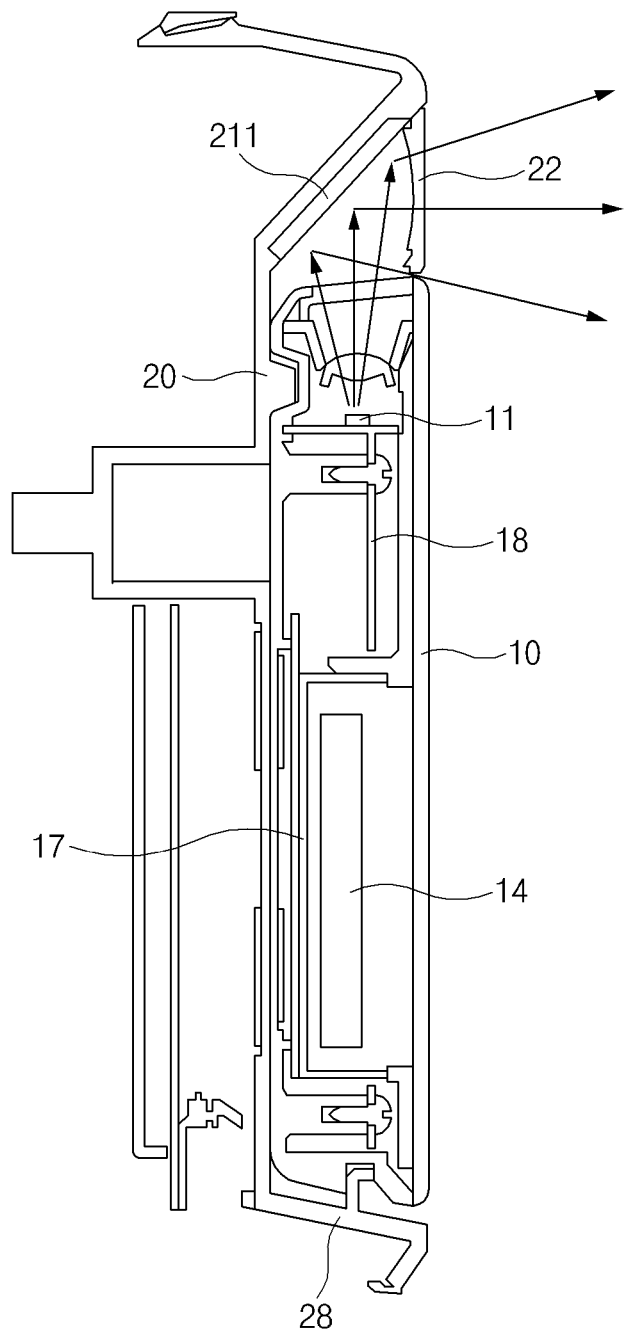
FIG. 3 is a cross-sectional view of a state in which the exemplary flashlight according to the present invention is fixed to a stationary part.

Referring to FIGS. 1 and 3, the stationary part 2 has a stationary housing 20 that has an accommodating part 21 having a shape corresponding to the lamp housing 10 and has an inclined reflective surface 211 formed on the top surface thereof corresponding to the opening surface of the lamp housing 10. Although being described below, a portion in which the reflective surface 211 is formed is used as a space into which a hand may enter so as to separate the flashlight 1 from the luggage lamp and is mounted with the reflective surface, such that a lamp of the flashlight may be used as the luggage lamp as it is without requiring the separate lamp.

The lamp housing 10 and the stationary housing 20 include the fastening member. Referring to FIGS. 1 to 3, the fastening member includes a stumbling groove 12 formed on a bottom surface that is an opposite surface to the opening surface of the lamp housing 10, fastening jaws 19 formed on both sides of the lamp housing 10, a stumbling projection 28 formed on the bottom surface of the stationary housing 20, and a fastening projection 27 mounted at a position corresponding to the mounting position of the fastening jaws 19 on both sides thereof.

Figure 4:
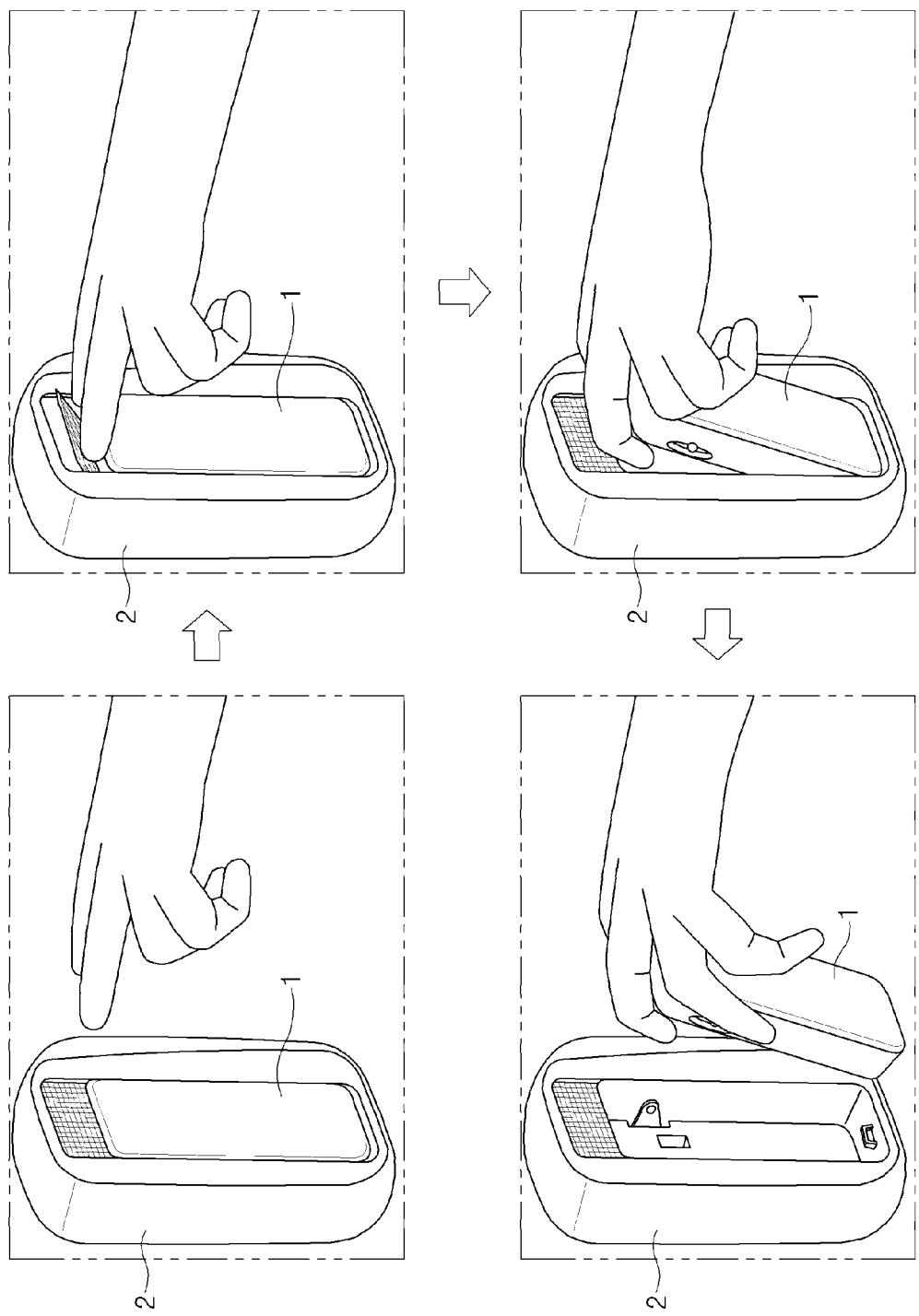
FIG. 4 is a diagram showing a scene on which the exemplary flashlight according to the present invention is separated from the stationary part.
Figure 5:
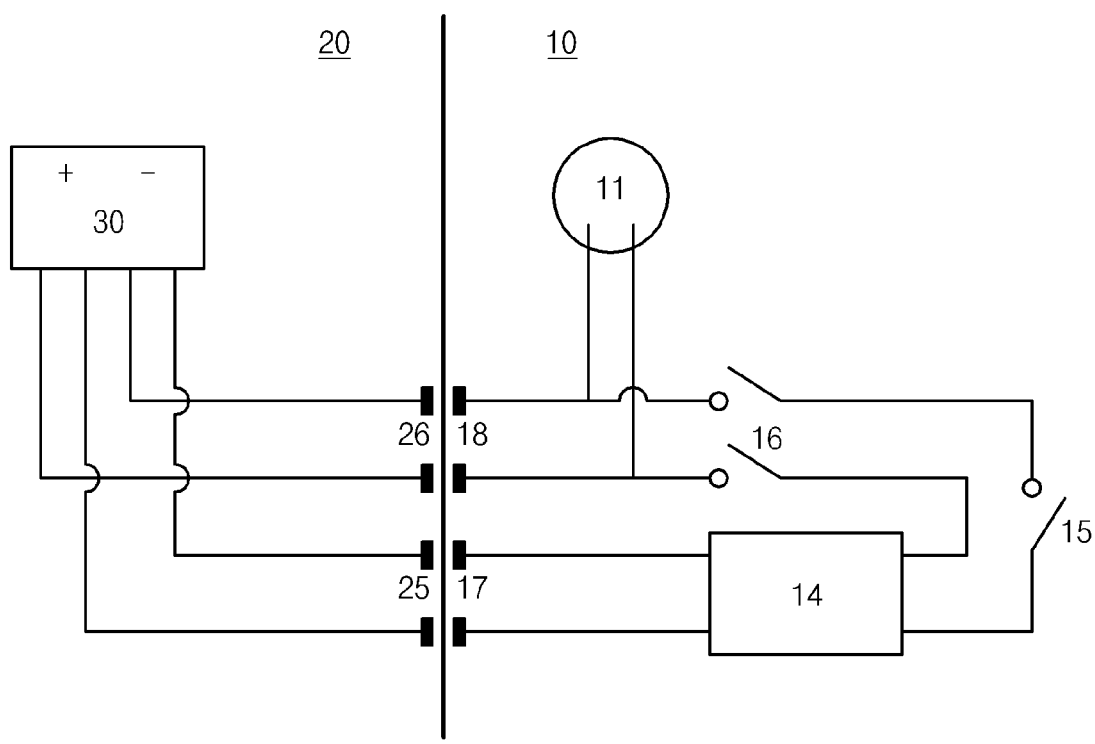
FIG. 5 is an electric distribution diagram of an exemplary flashlight according to the exemplary embodiment of the present invention.

Therefore, at the time of fixing, the lamp housing 10 is pushed into the accommodating part 21 of the stationary housing 20 in the state in which the stumbling groove 12 is fitted into the stumbling projection 28 so that the fastening jaws 19 are fitted into the fastening projection 27. On the other hand, at the time of separating, as shown in FIG. 4, fingers put in the space formed by the reflective surface 211 to pull the opening surface of the lamp housing 10, thereby separating the fastening jaws 19 from the fastening projection 27 and then, separating the stumbling groove 12 from the stumbling projection 28.

Referring to FIGS. 1 and 3, both sides of the reflective surface 211 are fitted with a hinge optic 22 formed with a hinge shaft 23 so as to be rotatably coupled with the hinge optic 22, wherein the hinge optic is elastically supported outwardly by a spring 24. The spring 24 may be fixed to the stationary housing 20 using a spring fastening bracket 241.

According to the configuration, an outer surface of the hinge optic is disposed on the same plane as an outer surface 212 of the stationary housing at ordinary times and then, the hinge optic rotates to the reflective surface when being downwardly pressed with fingers so as to separate the flashlight 1 from the luggage lamp. Meanwhile, the hinge optic 22 covers the space into which a hand enters in the state in which the flashlight is fitted into the stationary part and as a result, a design is very excellent. This is pressed only when the flashlight is separated from the luggage lamp, which can make a good showing.

Hereinafter, an electric distribution diagram according to the exemplary embodiment of the present invention will be described.

According to the exemplary embodiment of the present invention, when separating the flashlight 1 from the luggage lamp, a user can directly control a turn on/off of the lamp by a first switch 15 in the lamp housing 10 and power required for the lamp is supplied from the battery 14.

Meanwhile, the battery 14 is charged by a power supply 30 for a vehicle while electrically disconnecting the battery 14 from the lamp 11 in the state in which the flashlight 1 is fitted into the stationary part 2 and the vehicle side or the flashlight is provided with a circuit for preventing overcharging. Meanwhile, it is configured to control power required for the lamp 11 in a vehicle in the state in which the flashlight 1 is fitted into the stationary part 2.

To this end, the stationary housing 20 includes connection terminals 25 and 26 connected with the power supply 30 for a vehicle, the lamp housing 11 includes connection terminals 17 and 18 that are connected with the connection terminals 25 and 26, respectively, the connection terminal 17 is connected with the battery 14, the battery 14 is charged with normal power that is input from the connection terminal 17, the connection terminal 18 is connected with the lamp 11, and the lamp 11 is turned on/off by the controlled power that is input from the connection terminal 18.

In this configuration, the battery 14 and the lamp 11 are electrically connected with each other through the first switch 15 and a second switch 16.

As described above, the first switch 15 is a switch that is mounted in the lamp housing 10 to be opened or closed by the user.

The second switch 16 is opened by being pressed by a pressing part formed in the stationary housing when the lamp housing 10 is accommodated in the fixing housing 20, and the like, and the second switch 16 is closed by being pressed off when the lamp housing 10 is separated from the stationary housing 20.

Therefore, the second switch 16 is in a closed state in the state in which the flashlight 1 is separated from the luggage lamp and therefore, the turn on/off the flashlight can be controlled by the control of the first switch 15 and when the flashlight is fitted into the vehicle, the second switch is opened to electrically separate the battery from the lamp and the battery may be charged by the power supply for the vehicle.

As set forth above, the exemplary embodiments of the present invention can perform the functions of the luggage lamp and the flashlight as the single light source to reduce the number of parts and the weight and cost, use as the reflective surface the space into which a hand enters so as to separate the flashlight and use very efficiently the space by mounting the hinge optic therein, and remarkably improve the appearance.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A detachable luggage lamp including a flashlight fixable to a stationary part for use as a luggage lamp and removable from the stationary part for portable use, wherein the flashlight includes:
   a lamp housing having an opening surface formed on one side thereof;
   a lamp disposed in the opening surface; and
   a battery embedded in the lamp housing and supplying power to the lamp;
   wherein the stationary part includes a stationary housing having an accommodating part having a shape corresponding to the lamp housing and having an inclined reflective surface mounted on a surface thereof corresponding to the opening surface of the lamp housing;
   wherein the stationary part further includes a hinge optic formed with a hinge shaft, the hinge shaft is rotatably fitted to two inner sides of the accommodating part adjacent the reflective surface, the hinge optic being elastically supported outwards in a closed position by a spring,
   when the hinge optic is in the closed position, an outer surface of the hinge optic is disposed on the same plane as an outer surface of the stationary housing, thus covering a space inside the accommodating part by the reflective surface, and
   when fingers press the hinge optic, part of the hinge optic is rotated into the space allowing the fingers to separate the flashlight from the accommodating part;
   wherein the lamp housing and the stationary housing include a fastening member.

2. The detachable luggage lamp according to claim 1, wherein the fastening member includes:
   a stumbling groove formed on an opposite surface to the opening surface of the lamp housing;
   a fastening jaw formed on at least one side based on the opening surface and the opposite surface;
   a stumbling projection formed on an opposite surface of the reflective surface of the stationary housing; and
   a fastening projection mounted at a position corresponding to a mounting position of the fastening jaw on at least one side based on the reflective surface and the opposite surface; and
   wherein at the time of fixing, the lamp housing is pushed into the accommodating part of the stationary housing in a state in which the stumbling groove is fitted into the stumbling projection so that the fastening jaw is fitted into the fastening projection and at the time of separating, fingers put in the space formed by the reflective surface to pull the opening surface of the lamp housing, thereby separating the fastening jaw from the fastening projection and then, separating the stumbling groove from the stumbling projection.

3. The detachable luggage lamp according to claim 1, wherein the stationary housing includes first connection terminals connected with a power supply for a vehicle,
   the lamp housing includes second connection terminals that are connected with the first connection terminals, respectively,
   the second connection terminal is connected with the battery and the battery is charged with normal power that is input form the first connection terminal, and
   the second connection terminal is connected with the lamp and the lamp is turned on/off by the controlled power that is input from the first connection terminal.

4. The detachable luggage lamp according to claim 3, wherein the battery and the lamp are electrically connected with each other through a first switch and a second switch, and
   the first switch is a switch that is mounted in the lamp housing to be opened or closed by the user and the second switch is opened by being pressed when the lamp housing is accommodated in the stationary housing and is closed by being pressed off when the lamp housing is separated from the stationary housing.

* * * * *